United States Patent [19]
van Holtz et al.

[11] 3,946,690
[45] Mar. 30, 1976

[54] STEERING LARGE VESSELS

[75] Inventors: Leopold C. van Holtz; Wouter K. Wolters, both of Amsterdam, Netherlands

[73] Assignee: Shell Oil Company, Houston, Tex.

[22] Filed: Mar. 5, 1975

[21] Appl. No.: 555,500

[30] Foreign Application Priority Data
Mar. 11, 1974 United Kingdom............. 10741/74

[52] U.S. Cl.............. 114/144 E; 235/150.2; 318/588
[51] Int. Cl.²........................................ B63H 25/04
[58] Field of Search................ 114/144 E, 144 A; 180/79.1; 235/150.2; 244/50, 77 E; 318/588, 647

[56] References Cited

UNITED STATES PATENTS

| | | | |
|---|---|---|---|
| 3,140,436 | 7/1964 | Hatch | 244/77 E X |
| 3,741,474 | 6/1973 | Kawada et al. | 235/150.2 X |

*Primary Examiner*—Trygve M. Blix
*Assistant Examiner*—Stephen G. Kunin

[57] ABSTRACT

A process and apparatus for stabilizing the course angle of a large ship by producing a signal when the measured variation of the course angle with time reaches an extreme value and utilizing said signal to reset the rudder over a discrete angle towards starboard if the said extreme value is in the starboard direction and towards port in the opposite case.

7 Claims, 3 Drawing Figures

STEERING LARGE VESSELS

BACKGROUND OF THE INVENTION

The invention relates to a process and an apparatus for stabilizing the course angle of a ship. By course angle is understood here the angle between the heading and the North.

As a rule, the desired course of a ship can be maintained only by continually applying small corrections to the course. Without these continual corrections a course-unstable ship shows a tendency to keep turning either to port or to starboard. There is no preference for a direction of the turning; the turning is initiated by the prevailing conditions such as sea state, wind, irregularities in the ship's form, etc.

The extent of the course instability of a specific ship is difficult to predict quantitatively but qualitatively there is tendency of the course instability to become more serious according as the ship's form is blunter and fuller. This is the case particularly with large loaded tankers and here it is of great importance to take measures aimed at improving the steerability of the ship. The invention indicates ways and means of achieving important improvements in this respect.

SUMMARY OF THE INVENTION

The present invention has for its object to provide ways and means of achieving important improvements in stabilizing the course angle of a large ship.

The process according to the invention comprises measuring the variation of the course angle with time; producing a signal when the measured variation of the course angle with time reaches an extreme value and utilizing said signal to move the ship's rudder through a predetermined discrete angle relative to a neutral position, the rudder being reset towards starboard if the said extreme value is in the starboard direction and towards port if the said extreme value is in the port direction.

A known method of stabilizing the course of a ship consists in effecting a linear relationship between the rudder position and the rate of turn of the ship. It has been found, however, that this method has great inherent practical disadvantages. The actual rate of turn of the ship is extremely small which can be measured only with a very bad signal-to-noise ratio. As a result, the rudder tends to perform erratic motions. This will cause wear of the entire rudder mechanism. This also has an adverse effect on the speed of the ship. It has proved very difficult in practice to achieve an effective improvement of the signal-to-noise ratio by means that are in themselves known, such as the application of filters and improving the mounting of the measuring instrument.

The process according to the invention obviates the afore-mentioned difficulties, because the resetting of the rudder for the purpose of course stabilization is no longer linearly related to the rate of turn of the ship. The resetting of the rudder is done only at a salient point of the compass signal, after which the rudder position thus achieved is maintained during a specific time interval until the action at a next salient point of the compass signal. For a large tanker one aims at three rudder movements per minute. It will be clear from the foregoing that a great advantage has been achieved in this way.

The automatic control of the course angle stabilization according to the invention is anticipatory, because a counteracting rudder command is already given at a moment when the ship is still on a deviating course but has started the turn to the correct course. This turning motion is opposed by the rudder setting, so that a limitation is imposed on the tendency of the ship to continue the turning motion until a deviation from the correct course in the opposite direction occurs. The amplitude of the oscillation around the desired course is limited by the anticipatory control. This amplitude adapts itself to the chosen discrete value of the rudder resetting.

It is not necessary to know the magnitude of the extreme value in the variation of the course angle with time on which the discrete resetting of the rudder is based. Only the point of time at which an extreme value occurs is of importance. By allowing for a certain perception threshold, small variations of short duration in the course angle signal are prevented from influencing the resetting of the rudder. This can be achieved by providing for the resetting of the rudder not to occur until the course angle after having passed an extreme value has reached a predetermined difference with that extreme value. This difference may amount to 0.1 – 0.3 degree of arc.

It is known that a ship on both sides of the neutral position of the rudder has a rudder angle region within which a readjustment of the rudder has little effect or where the response of the ship to such a readjustment is even unpredictable. As a result there is a possibility of the ship starting to turn towards the non-desired direction. Thus there is little sense in resetting the rudder within this rudder angle area where reliability and effectiveness are low. The invention, now, prevents resettings in the said area. It has been found that as a rule a resetting of 2–5° of arc relative to the neutral position of the rudder is sufficient. The rudder is then always set to a position in which the response of the ship to the rudder is predictable. This considerably improves the steerability of a ship. The ship runs smoothly, a saving on fuel is obtained and/or a higher speed is attained.

The magnitude of the readjustment of the rudder in the port direction and that of the rudder readjustment in the starboard direction can be selected individually. In this selection allowance can be made for changes in wind direction, for irregularities in the ship's form, for the direction of the rotation of the propeller, for irregularities in the fouling of the ship's shell, etc. During the voyage the magnitude of one or of both resettings of the rudder can be changed, for instance in the case of a change in the weather.

The invention further provides the possibility of combining the normal procedure of steering the ship with the process for stabilizing the course angle as described hereinbefore. To this end the signal supplied by manual steering or by an auto-pilot can be added to the course angle stabilization signal. The rudder commands given by manual steering or by the auto-pilot are of a larger magnitude than the limited movements that are commanded automatically for the purpose of the course angle stabilization. Those larger movements are required in case of a course change or in case of deviations from the course that are not corrected by the course stabilization. Such deviations can be caused by factors such as currents in the water, lateral wind, technical disturbances, etc.

The apparatus according to the invention comprises course measuring means disposed on the ship to measure the actual course of said vessel and supply a course signal related thereto, peak amplitude measuring means, said peak amplitude measuring means being coupled to said course measuring means to detect the peak amplitude of said course signal, a subtracting circuit, said subtracting circuit being coupled to both said peak amplitude measuring means and said course measuring means to supply a difference signal related to the difference between said peak amplitude and the actual course, and switch means coupled to said subtracting circuit responsive to said difference signal to move the rudder a predetermined discrete angle towards starboard if the said peak amplitude is in the starboard direction and towards port in the opposite case whenever said difference signal exceeds a preset limit.

The peak amplitude measuring means may consist of a hold amplifier of which the output is connected to one of the inputs of the subtracting circuit of which the other input is connected to the signal output of the course angle meter. The subtracting circuit may be equipped with an adjustable signal magnitude detector. This may be a breakdown device that will become active when the incoming signal reaches a specific value or a gate with an adjustable threshold value.

The switch means may be equipped with a mechanism whose operation is subject to an adjustable threshold value of the signal required for the change-over.

The component(s) of the steering system for resetting the rudder through a discrete angle may consist of one or two servomotors of which the maximum shaft rotation is adjustable.

The processing of the signal from a course angle meter into a signal for resetting the rudder by a process according to the invention can be done not only by the components as described hereinbefore, which components may be of a fully solid-state design, but also by means of a digital computer programmed for that particular purpose.

BRIEF DESCRIPTION OF THE DRAWINGS

The invention will be more easily understood from the following detailed description of the attached drawings.

Figure 1:
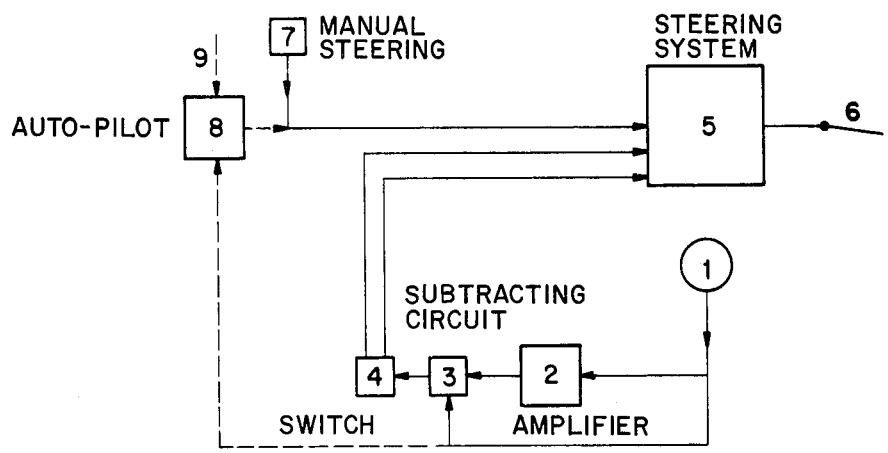
FIG. 1 represents a block diagram of a steering system according to the invention.

In the block diagram of FIG. 1 the course angle meter — the compass — is represented by the numeral 1. A signal corresponding to the measured course angle passes to a hold amplifier 2. The extreme value of the signal that has been reached is temporarily retained in the hold amplifier and is passed to a subtracting element 3. From this signal the course angle signal is subtracted. After the extreme value has been passed there is generated in the subtracting element a signal that is not equal to zero and that slowly increases in magnitude. When this difference reaches a specific value, then the switch device 4 becomes active. This may be a two-position switch device, whose position will then be changed. In the steering system 5 a mechanism will then be actuated which resets the rudder 6 through a predetermined angle relative to the neutral position of the rudder. The direction of the reset action is determined by the position of the switch device 4 which in turn is determined by the sign of the difference signal in the subtracting element 3.

The steering system 5 is further connected with the manual steering system 7 and/or with the auto-pilot 8 which compares the incoming signal from the compass 1 with the desired course 9 that can be set.

Figure 2:
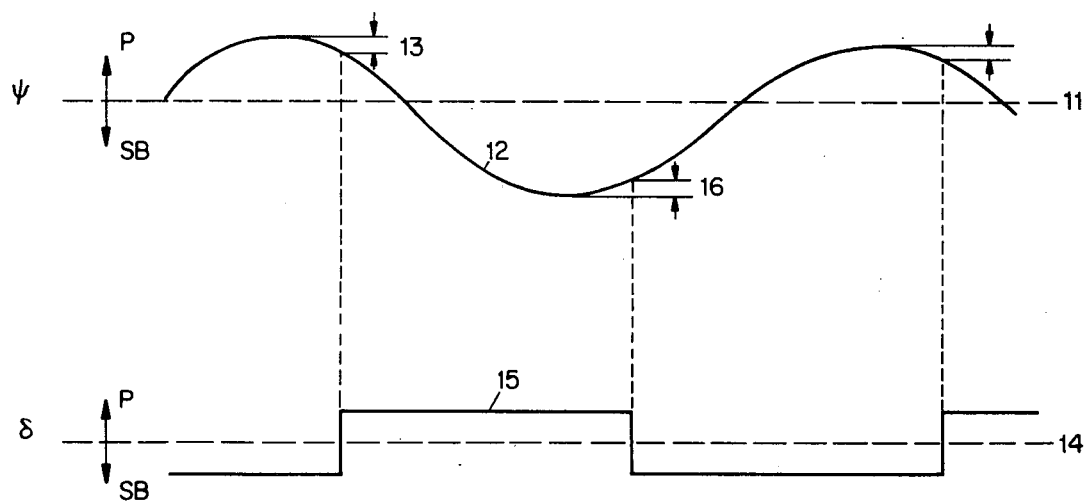
FIG. 2 gives a diagram of the relation between the resetting of the rudder and the measured course angle according to the invention.

In FIG. 2 the dotted line 11 represents the desired course of the ship and line 12 the actual course as a function of time. The desired course is adjusted from the bridge. Line 12 indicates the normal tendency of a ship to keep turning from port (P) to starboard (SB) and vice-versa. The courses are expressed as the course angle $\psi$ between the heading and the North.

In this example the ship starts to deviate to port. If nothing is done with the rudder position the deviation of the course angle will reach a maximum and the ship starts to turn to the correct course. This maximum is detected and the difference between this maximum and the course is measured. This difference increases slowly and if a certain threshold 13 is reached a switch action occurs. This switch action results in resetting the rudder to port over a predetermined discrete angle relative to the neutral position of the rudder at that moment. The dotted line 14 represents the neutral rudder position and line 15 the actual rudder position. The rudder position relative to the neutral position is the angle 8. The resetting to port takes place at a moment when the ship is still on a deviating course to port. However, the ship started to turn to the correct course and the rudder setting to port anticipates the coming deviation of the ship to starboard.

After $\psi$ having reached a maximum deviation to starboard and a threshold value 16 the rudder is moved to starboard over a predetermined discrete angle relative to the neutral rudder position.

The said threshold values are taken into account in order to avoid effects of too small course variations on rudder settings.

Figure 3:
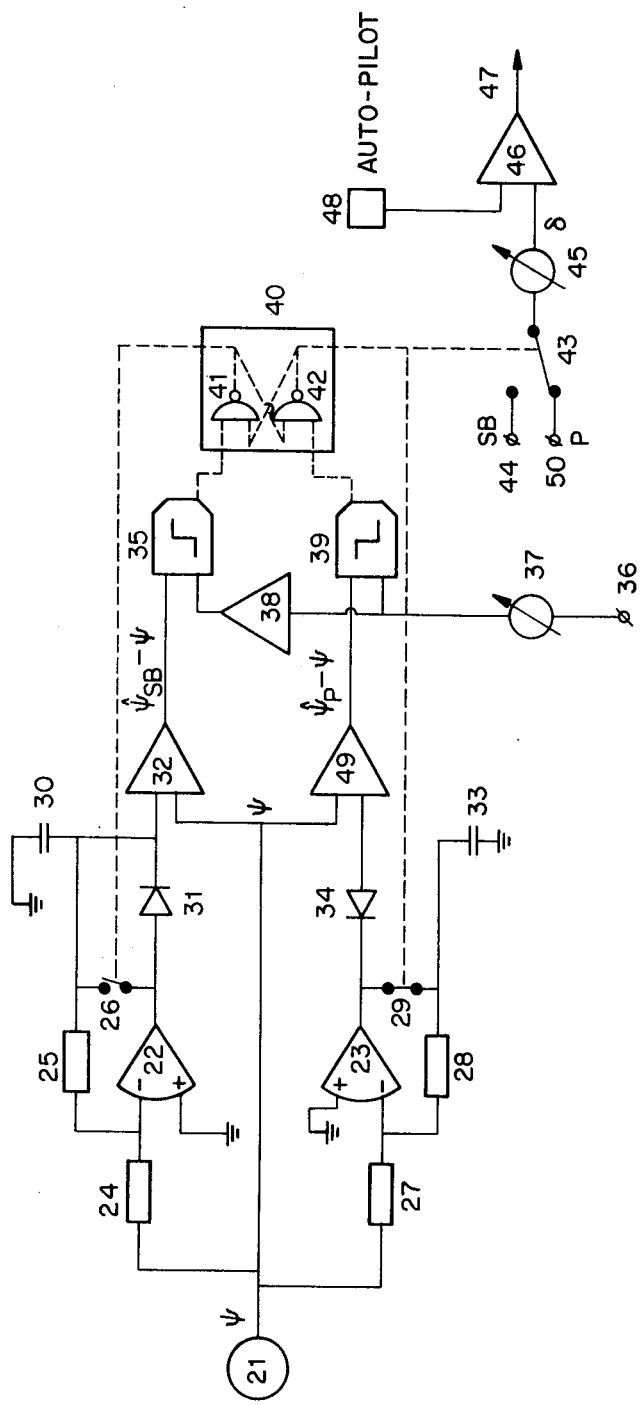
FIG. 3 gives a more detailed diagram of a steering system according to the invention.

In FIG. 3 the course angle meter is indicated by 21. Amplifiers 22 and 23 are high gain operational amplifiers. Amplifier 22 together with the resistors 24 and 25 and switch 26 in closed position form an inverting summer. This is also the case with the amplifier 23, resistors 27 and 28 and switch 29 in closed position.

With switch 26 in open position the following happens with the incoming signal representing the course angle $\psi$. Let us assume this signal to increase to starboard. Capacitor 30 is charged proportional to $\psi$ until a maximum value $\hat{\psi}_{SB}$ is reached. This means that the ship has reached a maximum course deviation to starboard. The $\psi$ signal then starts to decrease. The maximum value representing $\hat{\psi}_{SB}$ however is held in the capacitor 30 owing to the blocking action of diode 31. The output of subtracting element 32 represents the difference $\hat{\psi}_{SB} - \psi$ as will be clear from the drawing.

During this period switch 29 is closed as a result of which capacitor 33 is out of action as hold-capacitor. The diode 34 blocks in the direction opposite the diode 31. The combination 23, 27, 28, 34 and 29 in closed position is a pure inverting follower. Its output equals $-\psi$.

The difference $\hat{\psi}_{SB} - \psi$ is sent to a comparator 35 in which this difference is compared with an adjustable threshold value. This value is derived from a voltage source 36 and an adjusting element 37. An inverting amplifier 38 with amplification factor 1 is present in order to enable the use of the same source 36 for the comparators 35 and 39 which require signals with opposite sign. Comparator 35 gives an output signal if the difference $\hat{\psi}_{SB}-\psi$ reaches the said threshold value. This signal actuates the flip-flop circuit 40 with the NAND gates 41 and 42. As a result of this action switch 43 is moved to the SB position. Furthermore switch 26 is closed and switch 29 opened.

With switch 43 in the SB position an adjustable signal $\delta$ derived from source 44 and adjusting element 45 is sent to an summing amplifier 46. The output 47 controls the steering system, not indicated here. The summer 46 is further connected with the manual and/or auto-pilot steering system 48 operated from the bridge.

With switch 26 closed and switch 29 opened capacitor 33 holds the maximum deviation to port $\hat{\psi}_P$ once this maximum is reached. The output of subtracting element 49 represents $\hat{\psi}_P-\psi$ which finally results in bringing switch 43 to the P position with source 50.

If amplifier 22 or amplifier 23 acts as a pure inverting follower — switches 26 or 29 in closed position — a signal equalling $-\psi$ is sent to subtracting element 32 or 49 as a result of which no action of comparator 35 or 39 will follow.

We claim as our invention:

1. A process for stabilizing the course angle of a large ship comprising:
   measuring the variation of the course angle with time and producing a course angle signal:
   producing a maximum course angle signal when the measured variation related thereto of the course angle with time reaches an extreme value;
   comparing said maximum course angle signal with the instantaneous course angle signal and producing a course stabilizing signal; and
   utilizing said course stabilizing signal to move the ship's rudder through a predetermined discrete angle relative to a neutral position, the rudder being reset towards starboard if the said extreme value is in the starboard direction and towards port if the said extreme value is in the port direction.

2. The process of claim 1 in which the movement of the rudder from a neutral position in response to said course stabilizing signal is limited to between 2° and 5°.

3. The process of claim 1 in which the movement of the rudder in starboard and port directions are unequal.

4. The process of claim 1 in which normal steering changes in the rudder position are added to the movement of the rudder in response to the course stabilization signal.

5. An apparatus for stabilizing the course angle of a ship comprising:
   course measuring means disposed on the ship to measure the actual course of said vessel and supply a course signal related thereto;
   peak amplitude measuring means, said peak amplitude measuring means being coupled to said course measuring means to detect the peak amplitude of said course signal;
   a subtracting circuit, said subtracting circuit being coupled to both said peak amplitude measuring means and said course measuring means to supply a difference signal related to the difference between said peak amplitude and the actual course; and
   switch means coupled to said subtracting circuit and responsive to said difference signal to move the rudder a predetermined discrete angle towards starboard if the said peak amplitude is in the starboard direction and towards port in the opposite case whenever said difference signal exceeds a preset limit.

6. The apparatus of claim 5 wherein the peak amplitude measuring means consists of a hold amplifier having an output connected to one input of the subtracting circuit.

7. The apparatus of claim 6 and in addition an adjustable threshold circuit, said subtracting circuit being coupled to said adjustable threshold circuit, said adjustable threshold circuit being coupled to said switch means.

* * * * *